United States Patent [19]
Nakamachi

[11] Patent Number: 5,931,653
[45] Date of Patent: Aug. 3, 1999

[54] LOW NITROGEN OXIDE BURNER AND BURNING METHOD

[75] Inventor: Ichiro Nakamachi, Abiko, Japan

[73] Assignee: Tokyo Gas Co., Ltd., Tokyo, Japan

[21] Appl. No.: 08/506,028

[22] Filed: Jul. 24, 1995

[51] Int. Cl.$^6$ ..................................................... F23C 5/00
[52] U.S. Cl. .............................. 431/8; 431/181; 431/215; 432/180; 432/181
[58] Field of Search .............................. 431/215, 11, 164, 431/9, 181, 170; 432/180, 181, 179; 126/91 A, 91 R

[56] References Cited

U.S. PATENT DOCUMENTS

| | | | |
|---|---|---|---|
| 3,051,462 | 8/1962 | Fennell | 432/180 |
| 4,496,306 | 1/1985 | Okigami et al. | 431/8 |
| 4,842,509 | 6/1989 | Hasenack | 431/10 |
| 4,874,311 | 10/1989 | Gitman | 432/181 |
| 4,945,841 | 8/1990 | Nakamachi et al. | 110/341 |
| 5,000,158 | 3/1991 | Watson | 126/91 A |
| 5,076,779 | 12/1991 | Kobayashi | 431/8 |
| 5,154,599 | 10/1992 | Wunning | 431/215 |
| 5,180,300 | 1/1993 | Hovis et al. | 431/215 |
| 5,275,552 | 1/1994 | Schwartz et al. | 431/10 |
| 5,403,181 | 4/1995 | Tanaka et al. | 431/8 |

*Primary Examiner*—James C. Yeung
*Attorney, Agent, or Firm*—Townsend & Banta

[57] ABSTRACT

The present invention relates to a low nitrogen oxygen regenerative burner, a regenerative burner system and a regenerative burning method. The low nitrogen oxide regenerative burner is comprised of one or more pairs of regenerators having a regenerating section inside and air supply and exhaust ports which open directly opened into a furnace; and one or more fuel injection nozzles for each of the air supply and exhaust ports, which also open directly into the furnace at locations apart from the corresponding air supply and exhaust port. The regenerative burner system consists of a furnace body, the low nitrogen oxide regenerative burner and a control means. The regenerative burning method is the process whereby air is preheated in the regenerator, injected from the air supply and exhaust ports of the regenerators into the furnace, fuel from the fuel injection nozzles located apart from the air supply and exhaust ports, is injected. The air and fuel form respectively independent jets, and suck large amounts of the inert gas filling the furnace as the combustion product, to be mixed with it, before they are mixed with each other to initiate burning. After the air and fuel have been sufficiently diluted by the inert gas, they are mixed with each other for burning. Slow burning occurs at a low oxygen concentration, and the existence of a large amount of the inert gas can keep the flame temperature low, all of which effectively inhibit the formation of thermal NOx.

6 Claims, 6 Drawing Sheets

PRIOR ART

FIG. 7

PRIOR ART

LOW NITROGEN OXIDE BURNER AND BURNING METHOD

BACKGROUND

1. Field of the Invention

The present invention relates to an improved low nitrogen oxide combustion apparatus and method for use as regenerative burners and a regenerative combustion method, resulting in a low nitrogen oxide combustion and highly efficient heating system of particular value for use in high temperature industrial furnaces.

2. Description of Related Art

Figure 6:
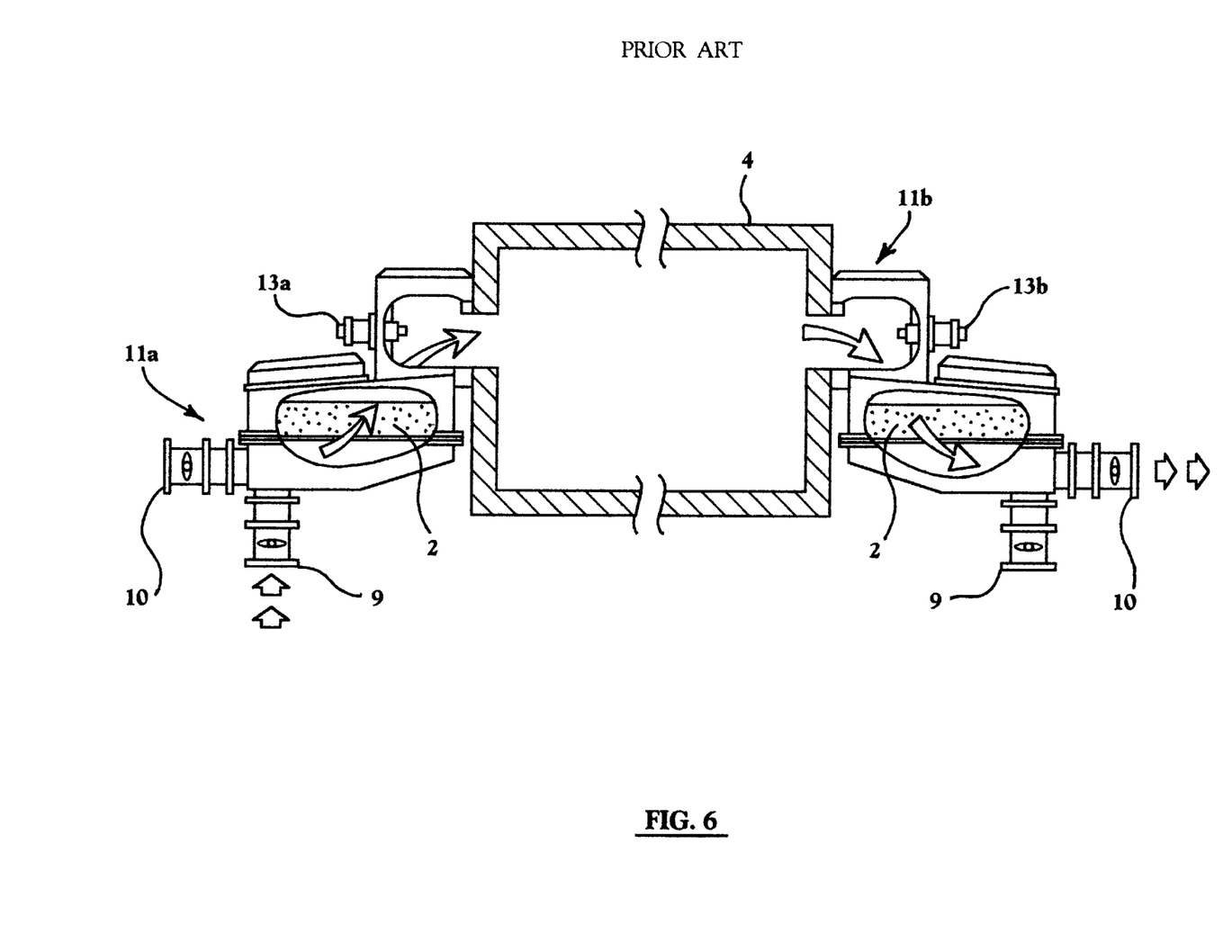
FIG. 6 is a sectional illustration showing a conventional regenerative burner (prior art).

The conventional regenerative burner is comprised of a pair of burner means consisting of a separate regenerating section 2 and fuel supply section 13, attached to the main furnace, as shown in Prior Art FIG. 6. In this case, the air is introduced from the air inlet or air introducing section 9, as shown by the arrows in the drawing, to one of the burner means 11a where it is preheated in the regenerating section 2. Then, preheated air is mixed with the fuel injected from the fuel supply section 13a, and the air-fuel mixture is ignited and the flame is subsequently injected into the furnace 4, where it continues to burn. The exhaust gas from the furnace 4 is further used for heat exchange, i.e. for heat regeneration, in the regenerating section of the next burner means 11b, and subsequently exits through the exhaust section 10. These burner means 11 are alternately used for burning and exhausting at very short intervals of tens of seconds to several minutes.

This combustion method, i.e., regenerative combustion method, can achieve a higher waste heat recovery rate resulting in greater fuel saving and it is also important when considering environmental protection concerns as this method also results in decreased $CO_2$ emissions.

Although the conventional regenerative combustion method is excellent as a means of increasing the rate of waste heat recovery, it has a very large disadvantage in that the temperature of the preheated combustion air is so high that the flame temperature is raised, which results in remarkably increased nitrogen oxide (NOx) emission.

Even if any conventionally known NOx decreasing techniques are applied to the regenerative combustion method, such as the staged combustion method, the exhaust gas recirculation method, or the water spray method, the NOx emission can be decreased at the most, by only 50 to 60%, from 500–1200 ppm ($O_2$ 11%) to 200–500 ppm ($O_2$ 11%). This reduction does not meet the regulatory level of 180 ppm ($O_2$ 11%) required by the Air Pollution Control Law of Japan.

The object of the present invention is to provide a combustion apparatus and combustion method which can achieve low NOx emissions even when used as a regenerative burner or as part of a regenerative combustion method, sufficient to heat combustion air to high temperatures, and which can achieve stable combustion, even with wide ranging furnace temperature.

SUMMARY OF THE INVENTION

The present invention solves the prior art problems discussed above by using a low nitrogen oxide combustion system comprising a furnace body; one or more pairs of regenerators such that only the regenerating section is located inside the regenerator installed in the furnace body such that the air supply and exhaust ports of the regenerators open directly into the furnace interior; and one or more fuel injection nozzles open directly into the furnace interior at locations apart from the corresponding air supply and exhaust ports of the regenerators. The burner system can optionally include an auxiliary fuel injection nozzle in one or more or each of the air supply and exhaust ports.

The present invention is also directed to a low nitrogen oxide regenerative burner comprised of one or more pairs of regenerators having a regenerating section located inside the regenerator, and one or more fuel injection nozzles located separate from the regenerator.

The present invention also provides a low nitrogen oxide combustion method, capable of effectively reducing the formation of nitrogen oxides while achieving maximum waste heat recovery with resulting fuel saving while maintaining low $CO_2$ emissions. Further, the present method can achieve stable combustion even with wide ranging furnace temperature.

The present invention further provides a low nitrogen oxide combustion method comprised of one or more pairs of regenerators in which the regenerating section is located inside the regenerator and the air supply and exhaust ports of the regenerators open directly into the furnace; and one or more fuel injection nozzles open directly into the furnace at locations apart from any air supply and exhaust ports, wherein when said regenerators are alternately used for combustion, the fuel may be steadily injected from each or all of the fuel injection nozzles.

The present invention still further provides a low nitrogen oxide combustion method, wherein fuel injection is introduced for combustion in synchronization with the air supply. In addition, in this method the air supply and exhaust can alternate in direction.

The present invention yet further provides a stable combustion at low furnace temperature, wherein an auxiliary fuel injection nozzle is provided in one or more or each of the air supply and exhaust ports.

The present invention further provides a low nitrogen oxide combustion method, comprising the use of a burner consisting of one or more pairs of regenerators in which the regenerating section is located inside the regenerator which is installed in a furnace body, and the air supply and exhaust ports of the regenerators open directly into the furnace; and one or more fuel injection nozzles, which ports directly open into the furnace at locations apart from any air supply and exhaust ports; and an auxiliary fuel injection nozzle, provided in one or more or each of the air supply and exhaust ports, wherein at a low temperature range the fuel can be injected from the auxiliary fuel injection nozzles to effect ordinary combustion and at high furnace temperatures, the auxiliary fuel injection nozzle is closed.

1a,b regenerator
2 regenerating section
3 air supply and exhaust port
4 furnace
5 auxiliary fuel injection nozzle
7a–g fuel injection nozzle
8a,b air introducing and exhaust section
9 air introducing section
10 exhaust section
11a,b burner means
12 center of burner means
13a,b fuel supply section
14 primary air hole
15 secondary air hole
16 air chamber
17 secondary fuel hole
18 primary air hole for swirl current

DECRIPTION OF THE PREFERRED EMBODIMENTS

The present invention provides a regenerative burner which can achieve sufficiently reduced NOx emission even when using a regenerative system to heat combustion air to high temperatures. The regenerative system can also achieve stable combustion even if the temperature of the furnace varies over a wide range. The regenerative systems are to be coupled with a furnace to allow for a new method of regenerative combustion.

Figure 1:
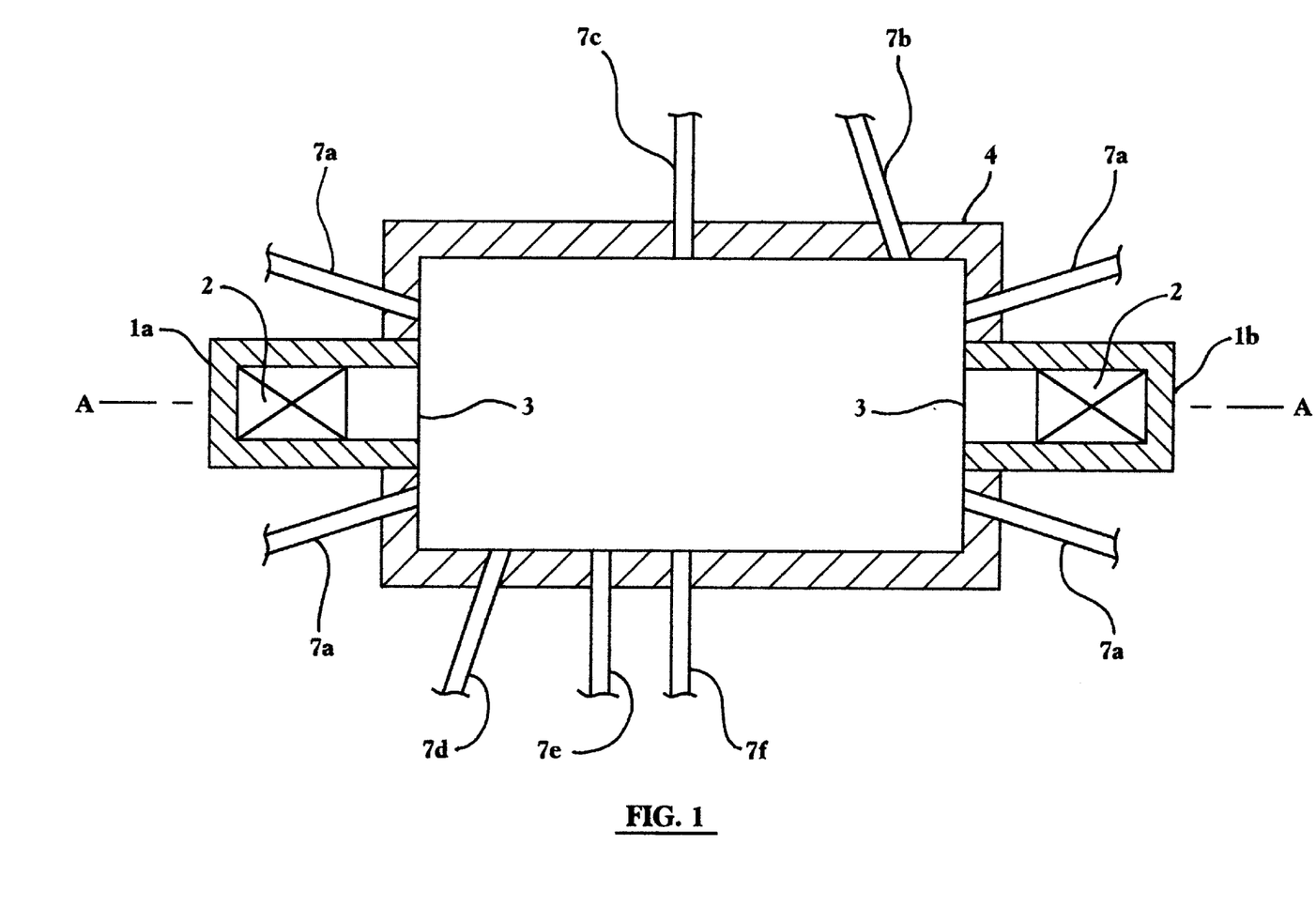
FIG. 1 is a sectional plan illustrating an embodiment of the present invention.
Figure 2:
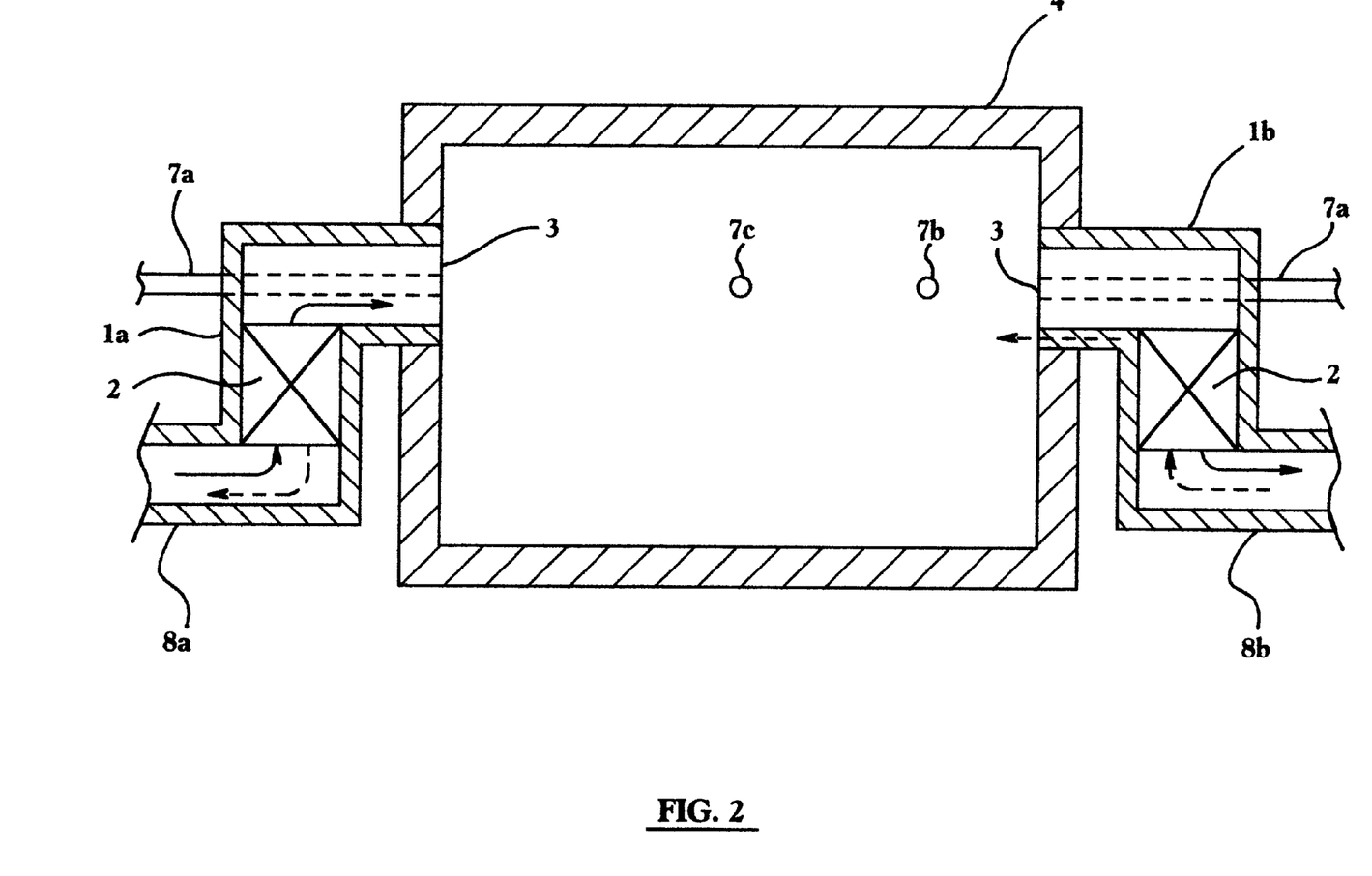
FIG. 2 is a vertical illustration along the line A—A of the embodiment shown in FIG. 1.
Figure 3:
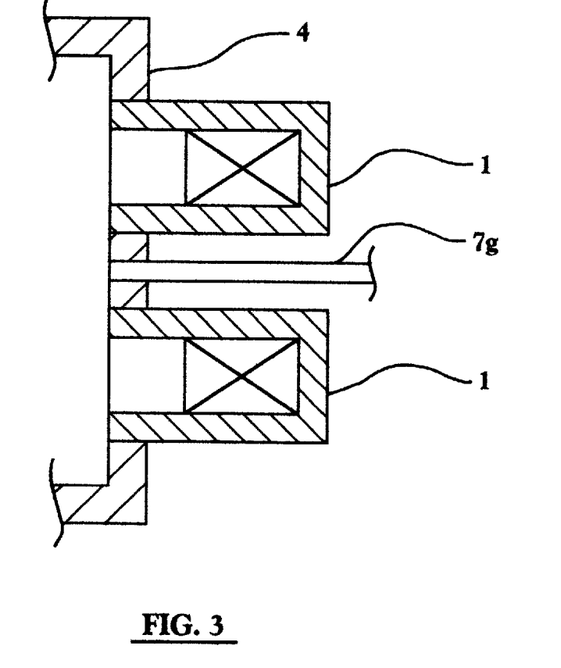
FIG. 3 is a partial sectional plan illustrating a portion of another embodiment of the present invention.
Figure 4:
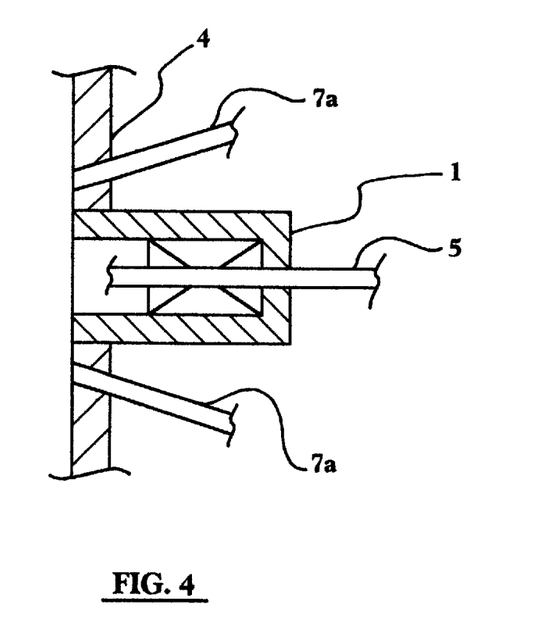
FIG. 4 is a partial sectional plan showing a portion of a further embodiment of the present invention.
Figure 5:
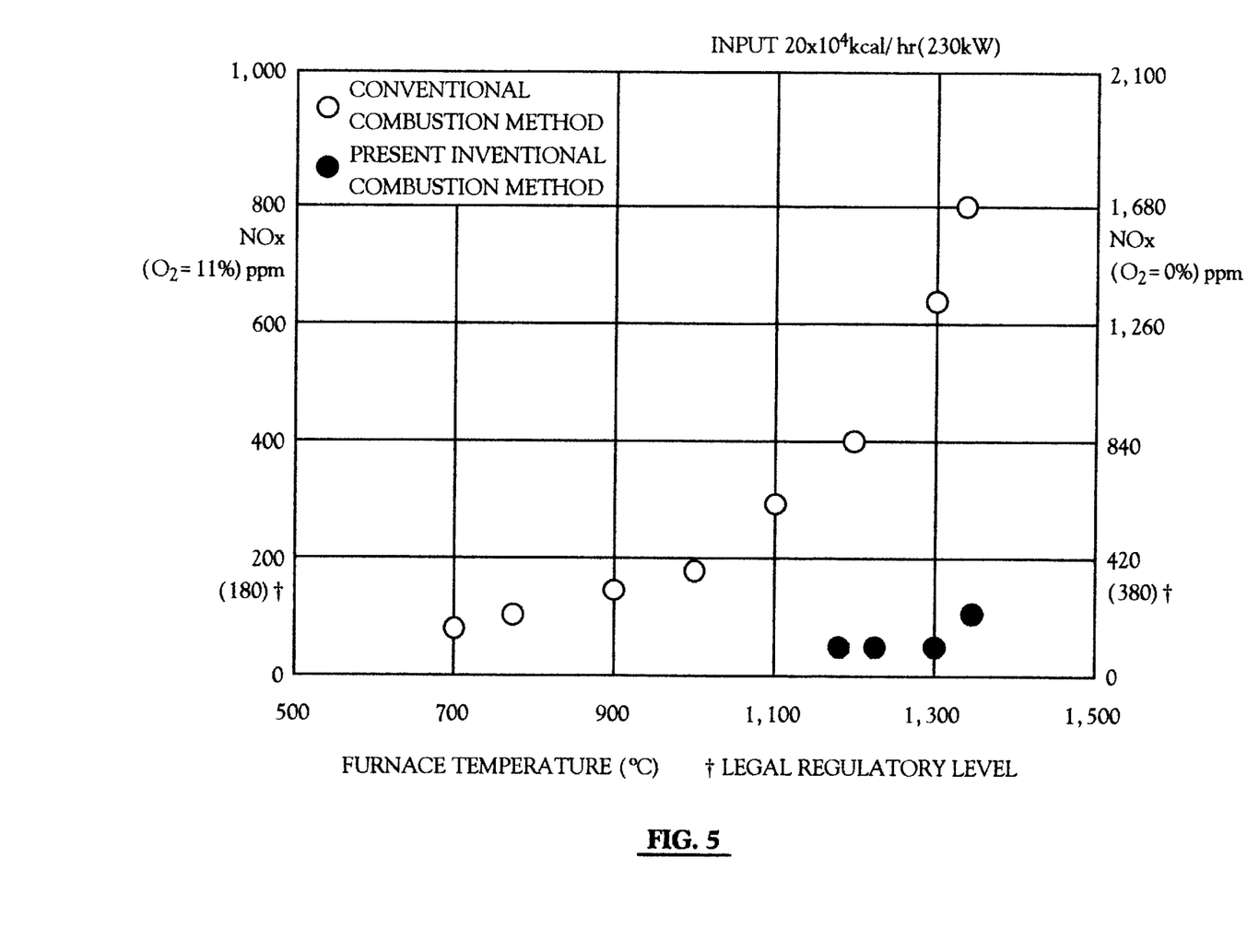
FIG. 5 is a diagram showing NOx levels produced by the regenerative combustion method of the present invention compared to that of the conventional regenerative burner. The markings in the diagram represent the following: ○ conventional combustion method; ● combustion method of the present invention; and * legal regulatory level, with the furnace temperature in degrees Centigrade (° C.).

The present invention also provides a low nitrogen oxide combustion system comprised of a furnace body; one or more pairs of the regenerative system consisting of a regenerating section inside, which is installed in the furnace body such that the air supply and exhaust ports of the regenerators open directly into the furnace; and one or more fuel injection nozzles also open directly into the furnace at locations apart from the corresponding air supply and exhaust port. There are a number of different configurations of these elements that can be used as various embodiments of the present invention. Examples of these embodiments are shown in FIGS. 1 through 3, where elements 7a through 7g are intended to represent a separate embodiment taken alone or in any combination. The system can optionally include an auxiliary fuel nozzle, an example of which is shown in FIG. 4.

The present invention also provides a low nitrogen oxide combustion method, comprising the use of a regenerative system made of a burner composed of one or more pairs of regenerators having a regenerating section inside, which is installed in a furnace body, the air supply and exhaust ports of the regenerators opening directly into the furnace, and one or more fuel injection nozzles, opening directly in the furnace at locations apart from the corresponding air supply and exhaust port, wherein when said regenerators are alternately used for combustion, the fuel is steadily injected from any or all of the fuel injection nozzles. The present invention further provides a low nitrogen oxide combustion method using the above system and an auxiliary fuel injection nozzle in one or more or each of the air supply and exhaust ports wherein the fuel from the auxiliary nozzle is injected only at low furnace temperatures but not injected at high furnace temperatures to achieve stable combustion.

The low nitrogen oxide burning method of the present invention comprises the steps of preheating air in the regenerator, injecting the preheated air as a jet from the air supply and exhaust ports of the regenerators, injecting fuel as a jet from the fuel injection nozzles located at sites apart from the air supply and exhaust ports, mixing the air and the fuel jets with furnace gas in the furnace interior, and combusting the mixture, whereby the flame exists in a low oxygen concentration environment. The flame temperature is maintained at a low level and thermal NOx formation is inhibited. In this process the air and fuel jets are independent of each other, and before they are mixed to initiate burning, they suck a large amount of furnace gas filling the furnace into the mixture as the combustion product. In other words, both the air and fuel are mixed with each other to burn, after they have been sufficiently diluted by the furnace gas. Therefore, combustion is slow as the oxygen concentration is kept low, and, in addition, the large amount of furnace gas present in the furnace keeps the flame temperature low, thereby effectively inhibiting the formation of thermal NOx.

The low nitrogen oxide regenerative combustion method comprises the above steps as well as the steps of exhausting the furnace gas through a second regenerator, the result of which is that the second regenerator's temperature is elevated by the exhausted furnace gas. The air is then reintroduced to the same regenerator. The heated regenerator is used to preheat the air that is to be introduced into the furnace as the cycle repeats itself. The fuel injection nozzles can be used for fuel injection in synchronization with the corresponding regenerators used for combustion or the nozzles can be used for steady fuel injection irrespective of the regenerator being used.

The regenerator designated by symbol 1 is shown in FIGS. 1 through 4. The regenerator consists of a port for introducing air and exhausting furnace gas, a regenerating section for preheating air or capturing heat from exhausted furnace gas, and an air supply and exhaust port which connects with the furnace interior. As illustrated in FIGS. 1 and 2, a pair of the regenerators 1, with a regenerating section 2 inside, are provided. One or more pairs of regenerators 1 are installed in a furnace 4. The regenerators can be installed in different configurations, such as in series as shown in FIG. 1, or in parallel as shown in FIG. 3. The regenerator's air supply and exhaust ports 3 open directly into the furnace 4. One or more fuel injection nozzles 7 (a,b,c,d,e,f, and g) open directly into the furnace 6 at locations apart from the corresponding air supply and exhaust port 3.

The positional relation between the air supply and exhaust ports 3 and the fuel injection nozzles 7 (a,b,c,d,e,f and g), their installation angles, injection velocities and their quantitative relationship can be selected as is appropriate for the furnace's application or requirements. The fuel injection nozzles 7 (a,b,c,d,e,f and g) can be located around the respective air supply and exhaust ports 3. Furthermore, the number of fuel injection nozzles (a,b,c,d,e,f and g) can be one or more for each of the regenerators 1.

As for the fuel injection method, the fuel injection nozzles 7(a,b,c,d,e,f and g) can be used alone or in any combination together for injection in synchronization with the corresponding regenerators 1, which in turn is alternately used for combustion, or the fuel injection nozzles 7(a,b,c,d,e,f, and g) can be used alone or in any combination together for steady fuel injection, irrespective of the regenerators 1 being used for combustion.

FIGS. 1 through 3 show more concrete embodiments. In FIG. 1, the fuel injection nozzles indicated by 7a show an example where they are located near and symmetrically on both sides of the air supply and exhaust ports 3. The nozzle 7a can be parallel or preferably angled inwardly toward the regenerator port 3. The fuel injection nozzle 7b illustrates an example where the nozzle is located apart from the air supply and exhaust ports 3, for injection toward and downstream of the air supply and exhaust ports 3. The fuel injection nozzles 7d, 7e and 7f illustrates examples of the use of multiple fuel injection nozzles. FIG. 3 illustrates an example where one fuel injection nozzle 7g is located between the air supply and exhaust ports 3 of regenerators provided in parallel. FIG. 4 illustrates an example where an auxiliary fuel injection nozzle 5 is provided axially in the air supply and exhaust ports 3.

The regenerative combustion system is comprised of the regenerative combustion which consists of at least one pair of regenerators and associated fuel nozzles; a furnace body and a control means for regulating and controlling the air temperature, air flow and direction, and fuel injection. The air is introduced into the system as shown by the solid line arrow in FIG. 2 from the air supply and exhaust section 8a of one of the regenerators 1. The air is preheated in the regenerating section 2, and injected into the furnace 4. The preheated air is mixed with furnace gas and fuel which is also mixed with furnace gas. The combination of preheated air, fuel and furnace gas in the appropriate mixture results in combustion. The hot combustion products (furnace gas) exhaust from the furnace holds heat which is to be exchanged in the regenerating section 2 of the second or next regenerator 1, and which is introduced into the second or next regenerator. The combustion products exits the system through the air supply and exhaust section 8b as shown by the solid line arrow in FIG. 2.

The regenerative combustion system or apparatus, is comprised of the burner and a control means which regulates the fuel flow and the air intake and exhaust such that air is introduced into the system; preheated in a first regenerator section; injected into the furnace; mixed with furnace gas; fuel is injected from the fuel injection nozzles into the furnace and mixed with furnace gas; the introduced air mixed with furnace gas, fuel mixed with furnace gas and furnace gas are mixed to form a combustion mixture; combustion occurs; and the combustion products are exhausted into a second regenerator. This system provides a means whereby nitrogen oxide formation is inhibited and heat recovery is achieved.

The regenerative combustion system can operate in a series or as a stand alone system. In the stand alone system the combustion process (or cycle) is repeated in either of two opposite directions alternately in short intervals of tens of seconds to several minutes. The broken line arrows in FIG. 2 illustrate a state where the combustion occurs in the other direction with air introduced from the regenerator 1a previously used for exhaust, and with the combustion products discharged from the regenerator 1b previously used for air supply. Thus, only preheated air is injected from the air supply and exhaust port 3 of one of the regenerators 1.

The fuel is injected separately from the preheated air. The fuel is injected from the fuel injection nozzles 7 (a,b,c,d,e,f, and g) located apart and spaced from the air supply and exhaust port 3. The air and fuel form respectively independent jets, and suck large amounts of the furnace gas filling the furnace to form the combustion mixture or combustion products. The preheated air, fuel and furnace gas are mixed with each other before combustion initiates. In other words, both the air and fuel are sufficiently diluted by the furnace gas, before they are mixed with each other to initiate combustion. Hence, slow combustion at a low oxygen concentrations occurs, and the presence of the furnace gas in a large amount keeps the flame temperature low and effectively inhibits the formation of thermal NOx.

The regenerative combustion method of the present invention for inhibiting the formation of nitrogen oxides comprises the steps of: introducing air into a regenerator through an air introducing and exhaust section; preheating said air in a first regenerator section located inside said regenerator; injecting said air directly into a furnace interior through an air supply and exhaust port; injecting fuel directly into said furnace interior from a fuel injection nozzle located apart from said air supply and exhaust port; mixing said air, fuel and furnace gas in said furnace interior to form a combustion mixture; allowing for combustion to occur resulting in the formation of combustion products; and exhausting said combustion products into a second regenerator, whereby nitrogen oxide formation is inhibited and heat recovery is achieved.

In experiments performed at a furnace temperature of 1300 degrees C., the NOx values of the conventional regenerative burner ranged between 500 to 1000 ppm ($O_2$ 11%), while those by the combustion method of the present invention ranged between 50 to 100 ppm ($O_2$ 11%), achieving a NOx reduction rate of about 90%. In the conventional regenerative burner, the fuel is supplied together with air into the furnace in an alternating fashion, but in the present invention it is possible to steadily supply the fuel without alternating action. Using the present invention, fuel changeover valves are not required, resulting in significant advantages in that the equipment can be simplified and the manufacturing and production costs can be reduced.

Figure 7:
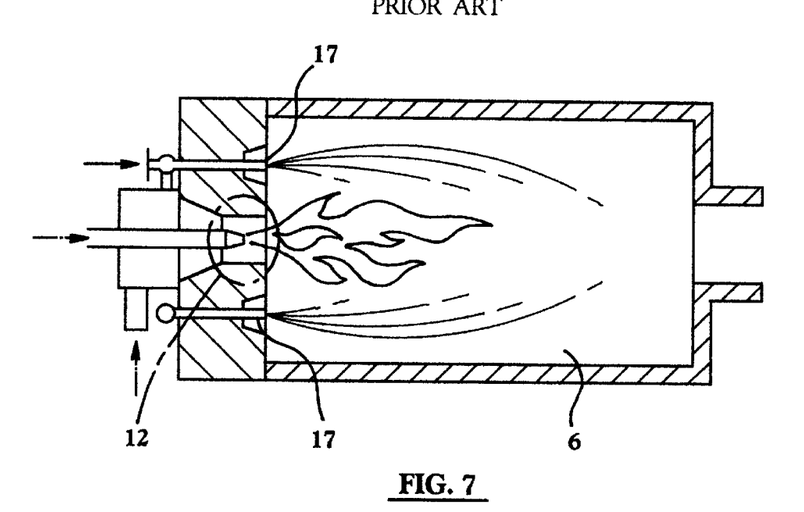
FIG. 7 is a sectional illustration showing a conventional embodiment (prior art).

For a clearer understanding of the present invention, the present invention is described in comparison with a conventional low NOx combustion apparatus and method shown in FIG. 7 and disclosed in U.S. Pat. No. 4,496,306.

FIG. 7 shows an example of the conventional fuel stage combustion method. In this conventional method, at the center of a burner means, part of the fuel and all the combustion air are mixed for combustion. The combustion occurs in the presence of large, excessive amount of air. From the surroundings of the large excessive air flame, the balance of the fuel is injected, to be mixed with the very excessive air flame in a downstream region. The purpose of the fuel stage combustion method is to reduce the NOx generated at the center by the fuel, to effect a complete combustion reaction with the surplus oxygen.

In this conventional example, the flame results from combustion of all of the introduced fresh combustion air which is mixed with the primary fuel. The fresh combustion air is not mixed with the furnace gas in the furnace 6 before combustion. The complete combustion of fuel requires large volumes of air. For example, in the case of combustion of natural gas, the amount of air required for complete combustion is more than 10 times the amount of the natural gas.

Unlike the conventional method, in the present invention the air jet sucks the furnace gas in the furnace into the combustion mixture of air and fuel, to be mixed with it before combustion. When the furnace gas is sucked into the combustion mixture by jets of fuel and air, the flow rate of air is overwhelmingly greater than that of fuel. The flow rate of the air contributes significantly to the momentum of the jet. Since the amount of the furnace gas sucked in from the furnace is proportional to the momentum of the jet, it is more effective to suck the furnace gas by air jet, and the air jet can suck a larger amount of the furnace gas very effectively into the combustion mixture for inhibiting the formation of NOx. However, in the conventional example shown in FIG. 7, since all of the oxygen rich air is mixed with the primary fuel for combustion, the formation of NOx starts immediately. The combustion causes the combustion products (in the presence of the very excessive oxygen rich air flame) to suddenly expand and stall, and thus to lose any force which would suck the furnace gas into the combustion mixture. Therefore, the conventional example of FIG. 7 has very small amounts of the furnace gas in the combustion mixture as compared to the present invention, hence the conventional method is much less effective in inhibiting NOx formation.

For further understanding of the present invention, the present invention is also described below in detail in comparison to another conventional low NOx combustion apparatus and method shown in FIG. 8 and disclosed in U.S. Pat. No. 4,842,509.

Figure 8A:
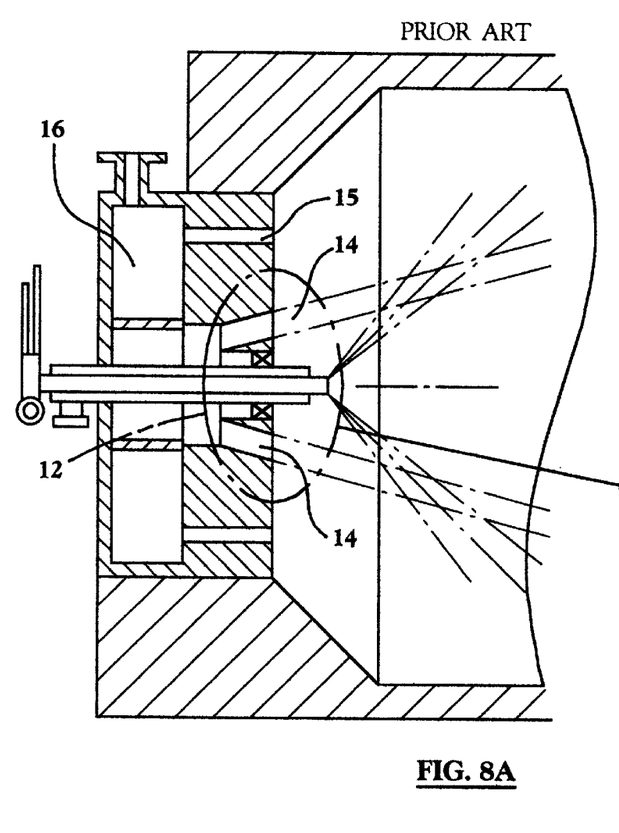
FIG. 8A is a sectional illustration showing another conventional embodiment (prior art).
Figure 8B:
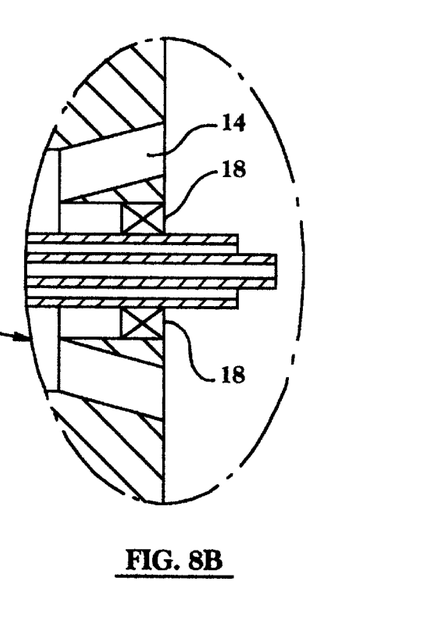
FIG. 8B is an enlarged view of the primary air hole area shown in FIG. 8A.

FIGS. 8A and 8B show a typical two-stage air combustion burner. At the center of a burner means, the fuel and less than the theoretically required amount of primary air are mixed for combustion, to form a stable primary combustion region. Secondary air holes are provided around the burner means, and the secondary air is mixed with the combustion products formed after the first step of primary combustion, to complete combustion. In the burner, as shown in FIGS. 8A and 8B, a fuel injection port and air injection ports are provided in a space surrounded by a refractory material, to initiate combustion in a combustion chamber, and for stabilizing the flame. Since the base of the flame is located in the thermally insulated space, radiation does not occur, and a high temperature is likely to occur. In contrast, in the present invention, the fuel injection ports 7 (*a,b,c,d,e,f* and *g*) and the air supply and exhaust ports 3 are located to directly open into the furnace. So, the flame is formed in the internal space of the furnace, and radiation toward the surrounding areas occurs simultaneously with the initiation of combustion which effectively keeps the flame temperature low.

Moreover, in the action of sucking the furnace gas existing in the furnace, to be mixed with the combustion mixture, the burner of FIGS. 8A and 8B is estimated to have the effect dependent on the suction by the air jets, but the suction amount is limited by the existence of the refractory wall, limiting the effect of decreasing NOx by the furnace gas recirculated in the furnace. In contrast, in the present invention, since the fuel jets and the air jets are directly formed in the furnace 4, there is nothing to limit the suction of the furnace gas existing in the furnace, and the respective jets can suck large amounts of the furnace gas into the combustion mixture, achieving a remarkable reduction in NOx formation.

In the present invention, since combustion is caused after large amounts of the furnace gas have been sucked by and mixed with the jets of fuel and air, there might be a combustion stability problem. For example, combustion can stall when the furnace temperature is lower than the ignition temperature of the fuel. This problem is solved by using the following combustion apparatus and method of the present invention.

As shown in FIG. 4, an auxiliary fuel injection nozzle 5 is provided inside one or more or each of the air supply and exhaust ports 3. In this embodiment, when the furnace temperature is lower than 800 degree C., for example, the fuel injection nozzles 7 (*a,b,c,d,e,f* and *g*) are closed, and only the auxiliary fuel injection nozzle 5 is used. Combustion occurs when the fuel is mixed with the surrounding fresh air from the ports 3, and does not include the lower temperature gas in the furnace. Therefore, a stable flame can be formed when the furnace temperature is low, and under low temperature operation the NOx level likewise remains low.

When the furnace temperature rises higher, more than 800 degree C., for example, the auxiliary fuel injection nozzle 5 can be closed, and the fuel injection nozzles 7(*a,b,c, d, e, f* and *g*) are opened as stated before, to inject the fuel only from the fuel injection nozzles 7(*a,b,c,d,e,f* and *g*). As a result, the combustion method of the present invention as described above occurs, and combustion is stabilized at high temperature, the formation of NOx is inhibited by using the large amounts of furnace gas recirculated in the furnace. At low temperatures, fuel is injected from the auxiliary fuel injection nozzle 5 only, to effect ordinary combustion, for stabilizing the flame, and at high temperatures, the auxiliary fuel injection nozzle 5 is closed, to effect low NOx combustion.

As described above, the present invention is an improvement of the conventional regenerative burner and effectively applies it in a unique combustion method which remarkably inhibits the formation of nitrogen oxides during combustion.

What is claimed is:

1. A low nitrogen oxide regenerative burner system comprising a furnace having an interior where fuel and air are reacted to form combustion products, one or more pairs of regenerators connected to said furnace, said regenerators having an inside regenerating section, an air supply and combustion gas exhaust section and an air supply and combustion gas exhaust port which opens directly into the furnace interior; and one or more fuel injection nozzles which open directly into said furnace interior at locations apart and spaced from each air supply and combustion gas exhaust port, said fuel injection nozzles and air supply and combustion gas exhaust ports being positioned in said furnace so that incoming fuel and air into the furnace interior are first mixed with combustion products in the furnace interior before combustion, and further comprising an auxiliary fuel injection nozzle provided in one or more of said air supply and combustion gas exhaust ports, whereby said auxiliary fuel injection nozzle is used only when the furnace temperature is low.

2. A low nitrogen oxide regenerative burner system comprising a furnace having an interior where fuel and air are reacted to form combustion products, one or more pairs of regenerators connected to said furnace, said regenerators having an inside regenerating section, an air supply and combustion gas exhaust section and an air supply and combustion gas exhaust Port which opens directly into the furnace interior; and one or more fuel injection nozzles which open directly into said furnace interior at locations apart and spaced from each air supply and combustion gas exhaust port, said fuel injection nozzles and air supply and combustion gas exhaust ports being positioned in said furnace so that incoming fuel and air into the furnace interior are first mixed with combustion products in the furnace interior before combustion, and further comprising an auxiliary fuel injection nozzle provided in each of said air supply and combustion gas exhaust ports, said auxiliary fuel injection nozzle being used only when the furnace temperature is low.

3. A low nitrogen oxide regenerative burner system comprising a furnace having an interior where fuel and air are reacted to form combustion products, one or more pairs of regenerators connected to said furnace, said regenerators having an inside regenerating section, an air supply and combustion gas exhaust section and an air supply and combustion gas exhaust port which opens directly into the furnace interior; and one or more fuel injection nozzles which open directly into said furnace interior at locations apart and spaced from each air supply and combustion gas exhaust port, said fuel injection nozzles and air supply and combustion gas exhaust ports being positioned in said furnace so that incoming fuel and air into the furnace interior are first mixed with combustion products in the furnace interior before combustion, and further comprising a control means wherein air is introduced into said system; preheated in a first regenerator section, injected into said furnace interior and mixed with furnace gas (combustion products); fuel is injected from said fuel injection nozzles to said furnace interior synchronizing with air injection and mixed with furnace gas (combustion products); combustion occurring in said furnace interior; and combustion products are exhausted into a second regenerator, whereby nitrogen oxide formation is inhibited and heat recovery is achieved, wherein after a lapse of from 10 seconds to 30 minutes, operation of two regenerators is switched to inject preheated air from said second regenerator into the furnace interior for combustion, and combustion products are exhausted from the first regenerator;

then injecting air through said second regenerator into said furnace interior from air supply and combustion gas exhaust port;

injecting fuel directly into said furnace interior from a fuel injection nozzle located apart from said air supply and combustion gas exhaust port;

mixing said air, fuel and furnace gas in said furnace interior to form a combustion mixture;

allowing for combustion to occur resulting in the formation of combustion products;

exhausting said combustion products into said first regenerator, whereby heat recovery is achieved and nitrogen oxide formation is inhibited; and injecting fuel from said fuel injection nozzles in synchronization with the corresponding injection of air from said air supply and combustion gas exhaust ports which are alternately used for air supply or combustion gas exhaust.

4. A regenerative burner system comprising a furnace having an interior where fuel and air are reacted to form combustion products, one or more pairs of regenerators connected to said furnace, said regenerators having an inside regenerating section, an air supply and combustion gas exhaust section and an air supply and combustion gas exhaust port which opens directly into the furnace interior, one or more fuel injection nozzles which open directly into said furnace interior at locations apart and spaced from each air supply and combustion gas exhaust port, said fuel injection nozzles and air supply and combustion gas exhaust ports being positioned in said furnace so that incoming fuel and air into the furnace interior are first mixed with combustion products in the furnace interior before combustion, and a control means wherein air is introduced into said system, preheated in a first regenerator section, infected into said furnace interior and mixed with furnace gas (combustion products); fuel is infected from said fuel injection nozzles to said furnace interior synchronizing with air injection and mixed with furnace gas (combustion products); combustion occurring in said furnace interior; and combustion products are exhausted into a second regenerator, whereby nitrogen oxide formation is inhibited and heat recovery is achieved, wherein after a lapse of from 10 seconds to 30 minutes, operation of two regenerators is switched to inject preheated air from said second regenerator into the furnace interior for combustion, and combustion products are exhausted from the first regenerator;

then infecting air through said second regenerator into said furnace interior from air supply and exhaust port;

iniecting fuel directly into said furnace interior from a fuel injection nozzle located apart from said air supply and exhaust port;

mixing said air, fuel and furnace gas in said furnace interior to form a combustion mixture;

allowing for combustion to occur resulting in the formation of combustion products;

exhausting said combustion products into said first regenerator, whereby heat recovery is achieved and nitrogen oxide formation is inhibited; and infecting fuel from said fuel injection nozzles in synchronization with the corresponding injection of air from said air supply and exhaust ports which are alternately used for air supply or exhaust;

whereby fuel is injected at a steady rate including during the periodical switching of air injection between said two regenerators.

5. A regenerative combustion method for inhibiting the formation of nitrogen oxides comprising the steps of:

introducing air into a first regenerator;

preheating said air in a first regenerator section located inside said first regenerator;

injecting said air directly into a furnace interior from a first air supply and combustion gas exhaust port; and mixing said infected air with furnace gas before mixing with said fuel;

injecting fuel directly into said furnace interior from a fuel injection nozzle located aDart from said first air supply and exhaust port and mixing said infected fuel with furnace gas before mixing with said air;

mixing the mixture of said air and furnace gas, the mixture of said fuel and furnace gas, and furnace gas in said furnace interior to form a combustion mixture;

allowing for combustion to occur resulting in the formation of combustion products; and exhausting resultant combustion products into a second regenerator, whereby nitrogen oxide formation is inhibited and heat recovery is achieved, and further comprising injecting fuel from an auxiliary fuel injection nozzle located axially inside of said air supply and combustion gas exhaust port at low furnace temperatures, and injecting fuel from a fuel nozzle located apart from said air supply and combustion gas exhaust port at higher furnace temperatures, thereby achieving stable combustion over a wide temperature range.

6. A regenerative combustion method for inhibiting the formation of nitrogen oxides comprising the steps of:

introducing air into a first regenerator;

preheating said air in a first regenerator section located inside said first regenerator;

injecting said air directly into a furnace interior from a first air supply and combustion gas exhaust port; and mixing said injected air with furnace gas before mixing with said fuel;

injecting fuel directly into said furnace interior from a fuel injection nozzle located apart from said first air supply and exhaust port and mixing said injected fuel with furnace gas before mixing with said air;

mixing the mixture of said air and furnace gas, the mixture of said fuel and furnace gas, and furnace gas in said furnace interior to form a combustion mixture;

allowing for combustion to occur resulting in the formation of combustion products; and exhausting resultant combustion products into a second regenerator, whereby nitrogen oxide formation is inhibited and heat recovery is achieved, and further comprising injecting fuel at a steady rate at higher furnace temperatures, including during periodical switching of air injection between the two regenerators.

* * * * *